United States Patent
Kim et al.

(10) Patent No.: US 11,192,981 B2
(45) Date of Patent: Dec. 7, 2021

(54) PREPARATION METHOD OF POLYARYLENE SULFIDE

(71) Applicant: LG CHEM, LTD., Seoul (KR)

(72) Inventors: Hansol Kim, Daejeon (KR); Joong Jin Han, Daejeon (KR); Eunju Park, Daejeon (KR); Hyun Woog Ryu, Daejeon (KR); Kwonsu Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 30 days.

(21) Appl. No.: 16/609,180

(22) PCT Filed: Oct. 18, 2018

(86) PCT No.: PCT/KR2018/012347
§ 371 (c)(1),
(2) Date: Oct. 28, 2019

(87) PCT Pub. No.: WO2019/078643
PCT Pub. Date: Apr. 25, 2019

(65) Prior Publication Data
US 2020/0087460 A1    Mar. 19, 2020

(30) Foreign Application Priority Data
Oct. 20, 2017 (KR) .................. 10-2017-0136514

(51) Int. Cl.
*C08G 75/0259* (2016.01)
*C08G 75/0254* (2016.01)
*C08G 75/0281* (2016.01)

(52) U.S. Cl.
CPC ..... *C08G 75/0259* (2013.01); *C08G 75/0254* (2013.01); *C08G 75/0281* (2013.01)

(58) Field of Classification Search
CPC ............... C08G 75/14; C08G 75/0263; C08G 75/0268; C08G 75/0259; C08G 75/025; C08G 75/0281
See application file for complete search history.

(56) References Cited

U.S. PATENT DOCUMENTS 4,415,729 A * 11/1983 Scoggins ........... C08G 75/0254
528/388
5,126,430 A *  6/1992 Senga ................. C08G 75/025
528/226
(Continued)

FOREIGN PATENT DOCUMENTS

CN          1793202 A       6/2006
CN        103172864 A       6/2013
(Continued)

OTHER PUBLICATIONS

Fahey et al., Mechanism of poly (p-phenylene sulfide) growth from p-dichlorobenzene and sodium sulfide, Macromolecules, vol. 24, No. 15, Jul. 1, 1991, pp. 4242-4249.

*Primary Examiner* — Shane Fang
(74) *Attorney, Agent, or Firm* — Dentons US LLP

(57) ABSTRACT

The present disclosure relates to a preparation method of a polyarylene sulfide, and this method may produce a polyarylene sulfide having properties equal to or higher than those of the conventional method at a high yield by adding an acidic compound in addition to existing materials for dehydration.

12 Claims, 1 Drawing Sheet

(56) References Cited

U.S. PATENT DOCUMENTS

| | | | |
|---|---|---|---|
| 5,350,833 A | 9/1994 | Inoue et al. | |
| 5,352,768 A | 10/1994 | Stuber et al. | |
| 2005/0043505 A1 | 2/2005 | Horiuchi et al. | |
| 2010/0210813 A1 | 8/2010 | Foder et al. | |
| 2011/0178268 A1 | 7/2011 | Suzuki et al. | |
| 2013/0065054 A1 | 3/2013 | Ichinose et al. | |
| 2013/0116401 A1 | 5/2013 | Kimura et al. | |
| 2015/0344632 A1 | 12/2015 | Chen et al. | |
| 2016/0244612 A1* | 8/2016 | Unohara | C08L 23/02 |
| 2017/0029570 A1 | 2/2017 | Kobayashi et al. | |
| 2019/0153162 A1 | 5/2019 | Konno et al. | |

FOREIGN PATENT DOCUMENTS

| | | |
|---|---|---|
| EP | 0418455 A2 | 2/1990 |
| EP | 2940061 A1 | 11/2015 |
| EP | 3608351 A1 | 2/2020 |
| JP | 3095315 B2 | 10/2000 |
| JP | 3690046 B2 | 8/2005 |
| JP | 3699777 B2 | 9/2005 |
| JP | 2010106179 A | 5/2010 |
| JP | 2012188625 A | 10/2012 |
| JP | 5623277 B2 | 11/2014 |
| KR | 1020110118780 A | 11/2011 |
| KR | 1020130026454 A | 3/2013 |
| KR | 101468825 B1 | 12/2014 |
| KR | 101711182 B1 | 2/2017 |
| WO | 2015166838 A1 | 11/2015 |
| WO | 2017-057732 A1 | 4/2017 |

* cited by examiner

【FIG. 1】
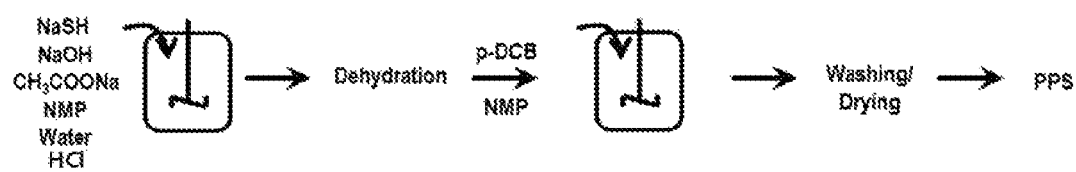
【FIG. 2】
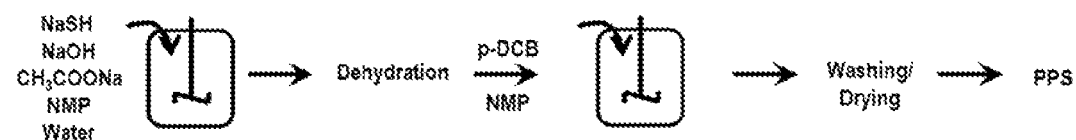

PREPARATION METHOD OF POLYARYLENE SULFIDE

The present application is a National Phase entry pursuant to 35 U.S.C. § 371 of International Application No. PCT/KR2018/012347 filed on Oct. 18, 2018, and priority to and the benefit of Korean Patent Application No. 10-2017-0136514 filed on Oct. 20, 2017 with the Korean Intellectual Property Office, the disclosure of which is incorporated herein by reference in its entirety.

FIELD

The present disclosure relates to a preparation method of a polyarylene sulfide having a high degree of polymerization, which exhibits excellent strength, heat resistance, flame retardancy, and processability, when processed into a molded product, at a high yield.

BACKGROUND

Polyarylene sulfide (PAS), which is represented by polyphenylene sulfide (PPS), has been widely used in automobiles, electrical and electronic products, machinery, and the like to replace metals, especially die cast metals such as aluminum and zinc, due to its excellent strength, heat resistance, flame retardancy, and processability. Particularly, since PPS resin has excellent flowability, it is suitable for use as a compound by kneading with a filler such as glass fiber or a reinforcing agent.

Generally, PAS is prepared by polymerizing a sulfur source and a dihalogenated aromatic compound in the presence of an amide-based compound such as N-methyl pyrrolidone (NMP). A molecular weight modifier such as an alkali metal salt may be optionally further used.

As PAS is widely used for various purposes, and is particularly used as a molded product by melt-processing, it is required that PAS have excellent product characteristics and moldability such as a high degree of polymerization, and specifically high melt viscosity.

Along with an increase in demand for PAS, it is also required to improve yield in the preparation of PAS. For example, Japanese Patent No. 5623277 discloses a production process of a granular PAS including a step of adding an aromatic compound such as a dihalo aromatic compound and a trihaloaromatic compound to a liquid phase in a polymerization reaction system after a phase-separation polymerization process, and a step of cooling the liquid phase. This process can produce granular PAS at a high yield while maintaining the melt viscosity at a high level. There has been a demand for a method capable of further improving the yield of PAS having a high degree of polymerization.

Therefore, in the process for preparing a polyarylene sulfide in which a sulfur source and a dihalogenated aromatic compound are subjected to a polymerization reaction in the presence of an amide-based compound, research on a preparation method of a polyarylene sulfide having a high degree of polymerization at a high yield is required.

SUMMARY

The present disclosure is to provide a preparation method of a polyarylene sulfide having excellent strength, heat resistance, flame retardancy, processability, and the like at a high yield by adding an acidic compound in a dehydration reaction for preparing a sulfur source.

According to an embodiment of the present disclosure, a preparation method of a polyarylene sulfide is provided, including: a first step of preparing a sulfur source including a sulfide of an alkali metal and a mixed solvent of water and an amide-based compound by dehydrating a hydrosulfide of an alkali metal and a hydroxide of an alkali metal in the presence of an organic acid salt of an alkali metal and an acidic compound in a mixed solvent of water and an amide-based compound; and a second step of adding a dihalogenated aromatic compound and an amide-based compound to a reactor containing the sulfur source, and performing a polymerization reaction to prepare a polyarylene sulfide.

In the present disclosure, the polyarylene sulfide may be produced at a yield of 80% or more, and may have a melting point ($T_m$) of 270° C. to 300° C. and a crystallization point ($T_c$) of 180° C. to 250° C.

According to the present disclosure, a polyarylene sulfide having excellent strength, heat resistance, flame retardancy, processability, and the like can be prepared at a high yield by additionally introducing an acidic compound into a dehydration reaction for preparing a sulfur source used in the polymerization of a polyarylene sulfide.

BRIEF DESCRIPTION OF THE DRAWINGS

FIG. 1 is a schematic view of a process for preparing a polyarylene sulfide of Example 1 according to an embodiment of the present disclosure.

FIG. 2 is a schematic view of a process for preparing a polyarylene sulfide of Comparative Example 1 according to the prior art.

DETAILED DESCRIPTION

In the present disclosure, the terms "the first", "the second", and the like are used to describe a variety of components, and these terms are merely employed to distinguish a certain component from other components.

The terminology used herein is only for the purpose of describing particular embodiments, and is not intended to be limiting of the invention. The singular forms are intended to include the plural forms as well, unless the context clearly indicates otherwise. It will be further understood that the terms "include", "have", or "possess" when used in this specification, specify the presence of stated features, numbers, steps, components, or combinations thereof, but do not preclude the presence or addition of one or more other features, numbers, steps, components, or combinations thereof.

As the present invention can be variously modified and have various forms, specific embodiments thereof are shown by way of examples and will be described in detail. However, it is not intended to limit the present invention to the particular form disclosed, and it should be understood that the present invention includes all modifications, equivalents, and replacements within the idea and technical scope of the present invention.

Hereinafter, the present disclosure will be described in detail.

According to an embodiment of the present disclosure, a preparation method of a polyarylene sulfide is provided, in which a polymerization reaction of a sulfur source and a dihalogenated aromatic compound provides the polyarylene sulfide at a high yield by additionally introducing an acidic compound into a dehydration reaction for preparing a sulfur source.

The preparation method of a polyarylene sulfide includes: a first step of preparing a sulfur source including a sulfide of an alkali metal and a mixed solvent of water and an amide-based compound by dehydrating a hydrosulfide of an alkali metal and a hydroxide of an alkali metal in the presence of an organic acid salt of an alkali metal and an acidic compound in a mixed solvent of water and an amide-based compound; and a second step of adding a dihalogenated aromatic compound and an amide-based compound to a reactor containing the sulfur source, and performing a polymerization reaction to prepare a polyarylene sulfide.

In particular, the present disclosure is able to increase the yield of the final polyarylene sulfide by lowering the pH of reactants before dehydration through adding an acidic compound in the dehydration to prepare a sulfur source which will undergo a polymerization reaction with a dihalogenated aromatic compound to produce the polyarylene sulfide. In addition, the polyarylene sulfide capable of providing a final polymer product having a thermal property that is equivalent to or higher than that of the conventional polymer product can be easily prepared. Further, the preparation method of a polyarylene sulfide of the present disclosure can also improve the yield, and increase the amount of the final product.

First, the preparation method of a polyarylene sulfide according to an embodiment of the present disclosure will be described in each step.

The above-described first step is preparing a sulfur source.

The sulfur source is prepared by dehydrating a hydrosulfide of an alkali metal, a hydroxide of an alkali metal, and an acidic compound in a mixed solvent of water and an amide-based compound. Therefore, the sulfur source may include the mixed solvent of water and an amide-based compound remaining after the dehydration, together with a sulfide of an alkali metal prepared by the reaction of the hydrosulfide of an alkali metal with the hydroxide of an alkali metal.

Further, the present disclosure is characterized in that an acidic compound such as hydrochloric acid (HCl) is added during the preparation of the sulfur source.

Thereafter, in the present disclosure, a polyarylene sulfide is prepared at a high yield by continuously polymerizing the sulfur source, the dihalogenated aromatic compound, and the amide-based compound.

The acidic compound may be used in an amount of about 0.1 to 10 equivalents, or about 0.1 to 5 equivalents, more specifically about 0.1 to 1 equivalents, or about 0.1 to 0.5 equivalents, based on 1 equivalent of the sulfur source. The acidic compound may be used in an amount of about 0.1 equivalent or more to achieve the effect of the addition. When the acidic compound is used in an amount exceeding an equivalent amount of a basic substance which is initially added, polymerization may not be performed properly during dehydration and polymerization. In this regard, the acidic compound may be used, for example, in an amount of about 0.1 to 2.0 equivalents, or about 0.1 to 1.5 equivalents, more specifically about 0.1 to 1 equivalents, or about 0.1 to 0.5 equivalents, based on 1 equivalent of the hydrosulfide of an alkali metal.

Specifically, the acidic compound may have a pH of about 4 or less, a pH of about 0 to 4, or a pH of about 0.01 to 3.8, so as to lower the pH of the reactants before dehydration.

For example, the acidic compound may be at least one inorganic acid selected from the group consisting of hydrochloric acid, sulfuric acid, and nitric acid, and preferably hydrochloric acid.

Meanwhile, the sulfide of an alkali metal may be determined depending on the type of the hydrosulfide of an alkali metal used in the reaction. Specific examples thereof include lithium sulfide, sodium sulfide, potassium sulfide, rubidium sulfide, and cesium sulfide, and any one or a mixture of two or more thereof may be used.

Specific examples of the hydrosulfide of an alkali metal that can be used in the preparation of the sulfur source by reacting the hydrosulfide of an alkali metal with the hydroxide of an alkali metal include lithium hydrogen sulfide, sodium hydrogen sulfide, potassium hydrogen sulfide, rubidium hydrogen sulfide, cesium hydrogen sulfide, and the like. Any one or a mixture of two or more thereof may be used, and an anhydride or a hydrate thereof may be used.

Specific examples of the hydroxide of an alkali metal include lithium hydroxide, sodium hydroxide, potassium hydroxide, rubidium hydroxide, cesium hydroxide and the like, and any one or a mixture of two or more thereof may be used. The hydroxide of an alkali metal may be used in an amount of 0.90 to 2.0 equivalents, more specifically 1.0 to 1.5 equivalents, and more particularly 1.0 to 1.1 equivalents, based on 1 equivalent of the hydrosulfide of an alkali metal.

In the present disclosure, the equivalent refers to molar equivalent (eq/mol).

The reaction between the hydrosulfide of an alkali metal and the hydroxide of an alkali metal may be carried out in a mixed solvent of water and an amide-based compound. Specific examples of the amide-based compound include: amide compounds such as N,N-dimethylformamide or N,N-dimethylacetamide, pyrrolidone compounds such as N-methyl-2-pyrrolidone (NMP) or N-cyclohexyl-2-pyrrolidone; caprolactam compounds such as N-methyl-ε-caprolactam, imidazolidinone compounds such as 1,3-dialkyl-2-imidazolidinone; urea compounds such as tetramethyl urea; phosphoric acid amide compounds such as hexamethylphosphoric acid triamide; and the like, and any one or a mixture of two or more thereof may be used. Among them, the amide-based compound may preferably be N-methyl-2-pyrrolidone (NMP), considering reaction efficiency and a cosolvent effect as a polymerization solvent for preparing a polyarylene sulfide.

The water may be used in an amount of about 1 equivalent to 8 equivalents, specifically about 1.5 equivalents to 5 equivalents, and more specifically about 2.5 equivalents to 4.5 equivalents, based on 1 equivalent of the amide-based compound.

Further, in the preparation of the sulfur source by the reaction of the hydrosulfide of an alkali metal with the hydroxide of an alkali metal, an organic acid salt of an alkali metal capable of promoting the polymerization reaction and raising the degree of polymerization of a polyarylene sulfide in a short period of time may be added as a polymerization assistant. Specific examples of the organic acid salt of an alkali metal include lithium acetate, sodium acetate, and the like, and any one or a mixture of two or more thereof may be used. The organic acid salt of an alkali metal may be used in an amount of about 0.01 to 1.0 equivalents, specifically about 0.01 to 0.8 equivalents, and more specifically about 0.05 to 0.5 equivalents, based on 1 equivalent of the hydrosulfide of an alkali metal.

Meanwhile, in the first step, a sulfide of an alkali metal may be prepared by dehydrating reactants containing a hydrosulfide of an alkali metal and a hydroxide of an alkali metal. Herein, the dehydration reaction may be performed by stirring at about 100 to 500 rpm at a temperature of about 130° C. to 205° C. More specifically, the dehydration reaction may be performed by stirring at about 100 to 300 rpm at a temperature of about 175° C. to 200° C.

During the dehydration reaction, the solvent such as water in the reactants may be removed by distillation or the like, and some of the amide-based compound may be discharged together with the water. In addition, some of the sulfur contained in the sulfur source may react with water by heat during the dehydration reaction, and may be volatilized as hydrogen sulfide gas. Herein, a hydroxide of an alkali metal having the same number of moles as the above hydrogen sulfide may be prepared.

As a result of the reaction of the hydrosulfide of an alkali metal, the hydroxide of an alkali metal, and the alkali metal salt, a sulfide of an alkali metal is precipitated in a solid phase in a mixed solvent of water and an amide-based compound, and some of the unreacted hydrosulfide of an alkali metal may remain in the reaction system. Accordingly, when the sulfur source prepared by reacting the hydrosulfide of an alkali metal with the hydroxide of an alkali metal is used as a sulfur source in the preparation of a polyarylene sulfide according to the present disclosure, the molar ratio of the sulfur source refers to a total molar ratio of the sulfide of an alkali metal precipitated as a result of the reaction to the unreacted hydrosulfide of an alkali metal.

Further, during the dehydration reaction, the sulfur contained in the sulfur source reacts with water to produce hydrogen sulfide and a hydroxide of an alkali metal, and the generated hydrogen sulfide is volatilized. Therefore, the amount of sulfur in the sulfur source remaining in the system after the dehydration reaction may be reduced by the hydrogen sulfide which is volatilized out of the system during the dehydration reaction. For example, when using the sulfur source mainly containing a hydrosulfide of an alkali metal, the amount of sulfur remaining in the system after the dehydration reaction is equal to the molar amount of sulfur in the introduced sulfur source minus the molar amount of hydrogen sulfide volatilized out of the system. Therefore, it is necessary to quantify the amount of effective sulfur contained in the sulfur source remaining in the system after the dehydration reaction from the amount of hydrogen sulfide volatilized out of the system. Specifically, the dehydration reaction is carried out until the molar ratio of water to 1 mol of effective sulfur is about 1 to 5, specifically about 1.5 to 4, and more specifically about 2.0 to 3.5. When the water content in the sulfur source is excessively decreased by the dehydration reaction, water may be added to adjust the water content before the polymerization process.

Accordingly, the sulfur source prepared by the reaction of the hydrosulfide of an alkali metal with the hydroxide of an alkali metal and the dehydration as described above may include a mixed solvent of water and an amide-based compound together with a sulfide of an alkali metal, and the water may be included in a molar ratio of about 2.5 to 3.5 based on 1 mol of sulfur contained in the sulfur source. In addition, the sulfur source may further include a hydroxide of an alkali metal prepared by the reaction of sulfur with water.

According to an embodiment of the present disclosure, the second step is polymerizing the sulfur source with a dihalogenated aromatic compound to prepare a polyarylene sulfide.

The dihalogenated aromatic compound usable for the preparation of the polyarylene sulfide is a compound in which two hydrogen atoms of an aromatic ring are substituted with halogen atoms. Specific examples thereof include o-dihalobenzene, m-dihalobenzene, p-dihalobenzene, dihalotoluene, dihalonaphthalene, dihalobiphenyl, dihalobenzoic acid, dihalodiphenyl ether, dihalodiphenyl sulfone, dihalodiphenyl sulfoxide, and dihalodiphenyl ketone, and any one or a mixture of two or more thereof may be used. In the dihalogenated aromatic compound, the halogen atom may be fluorine, chlorine, bromine, or iodine. Among them, p-dichlorobenzene (p-DCB) may preferably be used in order to increase reactivity and suppress side reactions in the preparation of a polyarylene sulfide.

The dihalogenated aromatic compound may be added in an amount of about 0.8 to 1.2 equivalents. When the dihalogenated aromatic compound is added within the above range, a polyarylene sulfide having excellent physical properties may be obtained without lowering melting viscosity of the prepared polyarylene sulfide and increasing the content of chlorine present in the polyarylene sulfide. Considering the excellent effect of controlling the addition amount of the sulfur source and the dihalogenated aromatic compound, the dihalogenated aromatic compound may be added in an amount of about 0.8 to 1.1 equivalents.

Further, a step of lowering the temperature of the reactor containing the sulfur source to a temperature of about 150° C. to 200° C. may be further included before the second step to prevent vaporization of the dihalogenated aromatic compound.

Further, the polymerization reaction of the sulfur source and the dihalogenated aromatic compound may be carried out in a solvent of an amide-based compound which is a polar aprotic organic solvent and is stable to an alkali at a high temperature.

Specific examples of the amide-based compound are as described above, and pyrrolidone compounds such as N-methyl-2-pyrrolidone (NMP) or N-cyclohexyl-2-pyrrolidone are preferable considering reaction efficiency.

Since the amide-based compound contained in the sulfur source in the first step functions as a co-solvent, the amide-based compound may be added in the second step in a molar ratio of water ($H_2O$) to the amide-based compound present in the polymerization system (a ratio of water/an amide-based compound) to be about 0.85 or more.

During the polymerization reaction, other additives such as a molecular weight regulator, a cross-linking agent, and the like for controlling the polymerization reaction or the molecular weight may be further added in an amount that does not reduce the physical properties and the yield of the polyarylene sulfide to be finally prepared.

The polymerization reaction of the sulfur source and the dihalogenated aromatic compound may be carried out at about 200° C. to 300° C. Alternatively, the polymerization reaction may be carried out in multiple steps, while varying the temperature within the above-mentioned temperature range. Specifically, after the first polymerization reaction at about 200° C. or more and less than 250° C., the second polymerization reaction may be carried out at a higher temperature than that of the first polymerization reaction, specifically at about 250° C. to 300° C.

A reaction product prepared as a result of the above polymerization reaction is separated into an aqueous phase and an organic phase, and a polyarylene sulfide, which is a product of the polymerization reaction, is dissolved in the organic phase. Accordingly, a process for precipitation and separation of the prepared polyarylene sulfide may be selectively performed.

In particular, the precipitation of the polyarylene sulfide may be carried out by adding water to the reaction mixture in an amount of 3 to 5 equivalents based on 1 equivalent of sulfur, and then cooling. When the water is added within the above range, the polyarylene sulfide may be precipitated with excellent efficiency.

The precipitated polyarylene sulfide may be optionally further subjected to washing, filtration, and drying according to conventional methods.

As a specific preparation method of the polyarylene sulfide, the following examples may be referred to. However, the preparation method of the polyarylene sulfide is not limited to this description. The preparation method may further include a step which is usually carried out in the technical field of the present invention, and the step(s) of the preparation method may be changed by step(s) that are usually changeable.

Meanwhile, the preparation method of a polyarylene sulfide according to an embodiment of the present disclosure as described above may easily produce a polyarylene sulfide having a thermal property that is equal to or higher than that of the conventional method at an excellent yield.

Specifically, the polyarylene sulfide may be prepared by the above preparation method at a yield of about 80% or more, or about 84% or more. The polyarylene sulfide may have a melting point ($T_m$) of about 270° C. to 300° C., or about 275° C. to 300° C., and a crystallization point ($T_c$) of about 180° C. to 250° C., or about 210° C. to 250° C., as measured by thermal analysis using differential scanning calorimetry (DSC).

In addition, the polyarylene sulfide may have a weight average molecular weight (Mw) of about more than 10,000 g/mol and 30,000 g/mol or less. The weight average molecular weight (Mw) is measured by high temperature gel permeation chromatography (GPC).

Hereinafter, the present invention will be described in more detail with reference to the following preferred examples. However, these examples are for illustrative purposes only, and the invention is not intended to be limited by these examples.

EXAMPLES

Example 1

To prepare a PPS polymer, sodium sulfide was prepared by mixing 1.01 equivalents of 70% sodium hydrosulfide (NaHS) and 1.06 equivalents of sodium hydroxide (NaOH) in a reactor according to the method shown in FIG. 1. 0.2 equivalents of HCl was added to the reactor with 0.44 equivalents of sodium acetate powder, 1.65 equivalents of N-methyl-2-pyrrolidone (NMP), and 4.72 equivalents of DI water. The reactor was heated to 185° C. for 1 hour and 40 minutes while stirring at 150 rpm to perform a dehydration reaction.

Thereafter, the temperature of the reactor was lowered to 165° C., and 1.00 equivalent of p-dichlorobenzene (p-DCB) and 1.35 equivalents of N-methyl-2-pyrrolidone (NMP) were added to the reactor. Then, the reaction mixture was heated to 230° C. and allowed to react for 2 hours. It was then heated to 250° C. again, and further reacted for 2 hours.

After completion of the reaction, distilled water was added to the reactor in an amount of 3 equivalents based on 1 equivalent of sulfur, and the mixture was stirred for 5 minutes to collect a resultant product, a PPS polymer. The resultant product was repeatedly washed with distilled water and NMP until the pH reached 7.

Comparative Example 1

To prepare a PPS polymer, sodium sulfide was prepared by mixing 1.01 equivalents of 70% sodium hydrosulfide (NaHS) and 1.06 equivalents of sodium hydroxide (NaOH) in a reactor according to the method shown in FIG. 2. 0.44 equivalents of sodium acetate powder, 1.65 equivalents of N-methyl-2-pyrrolidone (NMP), and 4.72 equivalents of DI water were added to the reactor. The reactor was heated to 185° C. for 1 hour and 40 minutes while stirring at 150 rpm to perform a dehydration reaction.

Thereafter, the temperature of the reactor was lowered to 165° C., and 1.00 equivalent of p-dichlorobenzene (p-DCB) and 1.35 equivalents of N-methyl-2-pyrrolidone (NMP) were added to the reactor. Then, the reaction mixture was heated to 230° C. and allowed to react for 2 hours. It was then heated to 250° C. again, and further reacted for 2 hours.

After completion of the reaction, distilled water was added to the reactor in an amount of 3 equivalents based on 1 equivalent of sulfur, and the mixture was stirred for 5 minutes to collect a resultant product, a PPS polymer. The resultant product was repeatedly washed with distilled water and NMP until the pH reached 7.

Comparative Example 2

The dehydration reaction and the polymerization process were carried out in the same manner as in Comparative Example 1. However, the washing process of the PPS polymer obtained after the polymerization process was changed as follows. After the PPS polymer was stirred in an acidic aqueous solution containing 2 mL of acetic acid in 750 mL of distilled water for 30 minutes, the PPS polymer was collected and repeatedly washed with distilled water and NMP until the pH reached 7.

The PPS polymer was prepared in the same manner as in Comparative Example 1, except that the acidic aqueous solution was added to perform the washing process.

Experimental Example 1

Physical properties of the polyphenylene sulfide prepared in Example 1 and Comparative Examples 1 and 2 were measured in the following manner, and the results are shown in Table 1 below.

1) Yield: The weight of the collected polyphenylene sulfide was measured with an electronic scale.
2) Melting point (Tm): It was measured using differential scanning calorimeter (DSC, manufactured by Mettler).
3) Crystallization point (Tc): It was measured using differential scanning calorimeter (DSC, manufactured by Mettler).

TABLE 1

|  | Example 1 | Comparative Example 1 | Comparative Example 2 |
|---|---|---|---|
| Yield (%) | 84.30 | 75.77 | 72.21 |
| Tm (° C.) | 279.42 | 281.18 | 278.00 |
| Tc (° C.) | 214.27 | 216.04 | 214.67 |

As shown in Table 1, a polyarylene sulfide having a high melting point and a high crystallization point may be efficiently prepared at a high yield of 80% or more by adding 0.2 equivalents of HCl as an acidic compound based on the sulfur source in the polymerization step.

The invention claimed is:

1. A preparation method of a polyarylene sulfide, comprising:
preparing a sulfur source comprising a sulfide of an alkali metal by dehydrating a hydrosulfide of an alkali metal and a hydroxide of an alkali metal in the presence of an organic acid salt of an alkali metal and an acidic compound in a mixed solvent of water and an amide-based compound, wherein the acidic compound is present in an amount of 0.1 to 10 equivalents based on 1 equivalent of the sulfur source, and the acidic compound is at least one selected from the group consisting of hydrochloric acid, sulfuric acid, and nitric acid; and adding a dihalogenated aromatic compound and an amide-based compound to a reactor containing the sulfur source, and performing a polymerization reaction to prepare a polyarylene sulfide.

2. The preparation method of a polyarylene sulfide of claim 1, wherein the acidic compound has a pH of 4 or less.

3. The preparation method of a polyarylene sulfide of claim 1, wherein the water is used in an amount of 1 to 8 equivalents based on 1 equivalent of the amide-based compound.

4. The preparation method of a polyarylene sulfide of claim 1, wherein the organic acid salt of an alkali metal is used in an amount of 0.01 to 1.0 equivalents based on 1 equivalent of the hydrosulfide of an alkali metal.

5. The preparation method of a polyarylene sulfide of claim 1, wherein the organic acid salt of an alkali metal comprises lithium acetate, sodium acetate, or a mixture thereof.

6. The preparation method of a polyarylene sulfide of claim 1, wherein the dehydration reaction is performed at a temperature of 130° C. to 205° C.

7. The preparation method of a polyarylene sulfide of claim 1, wherein the sulfur source in the first step comprises water in a molar ratio of 2.5 to 3.5 based on 1 mol of sulfur.

8. The preparation method of a polyarylene sulfide of claim 1, wherein the dihalogenated aromatic compound comprises at least one selected from the group consisting of o-dihalobenzene, m-dihalobenzene, p-dihalobenzene, dihalotoluene, dihalonaphthalene, dihalobiphenyl, dihalobenzoic acid, dihalodiphenyl ether, dihalodiphenyl sulfone, dihalodiphenyl sulfoxide, and dihalodiphenyl ketone.

9. The preparation method of a polyarylene sulfide of claim 1, wherein the polyarylene sulfide is produced at a yield of 80% or more, has a melting point ($T_m$) of 270° C. to 300° C., and a crystallization point ($T_c$) of 180° C. to 250° C.

10. The preparation method of a polyarylene sulfide of claim 1, further comprising a step of lowering the temperature of the reactor containing the sulfur source to a temperature of 150° C. to 200° C. before the step of adding the dihalogenated aromatic compound and the amide-based compound to the reactor.

11. The preparation method of a polyarylene sulfide of claim 1, further comprising a cooling step of adding water to the reaction mixture in an amount of 3 to 5 equivalents based on 1 equivalent of sulfur after the step of adding the dihalogenated aromatic compound and the amide-based compound to the reactor.

12. The preparation method of a polyarylene sulfide of claim 11, further comprising a step of washing and then drying the reaction mixture using water and an amide-based compound after the cooling step.

* * * * *